Figure 3:
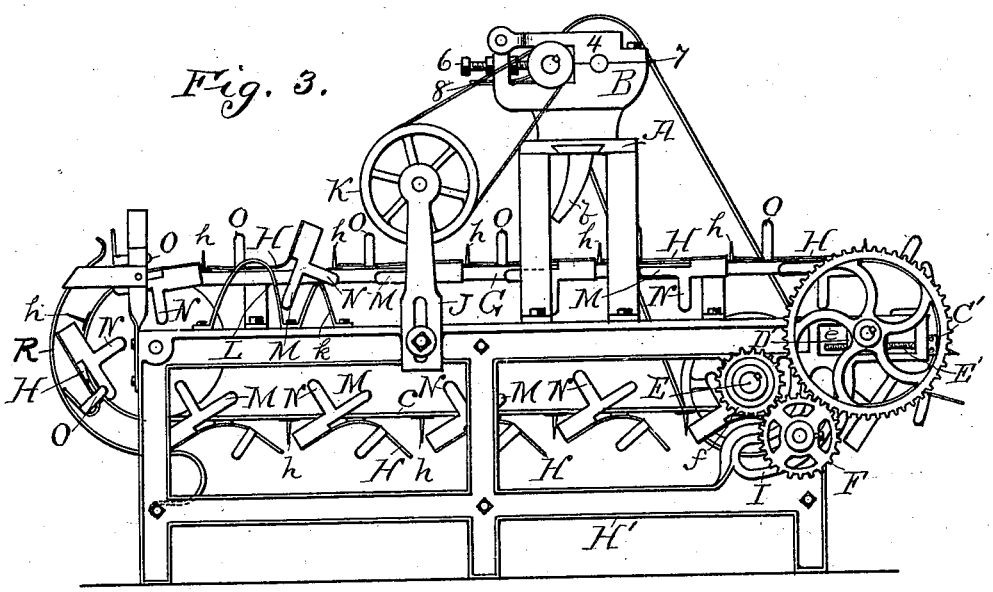

(No Model.) 2 Sheets—Sheet 1.
H. M. L. ANDERSON & J. NELSON.
MACHINE FOR FORMING LOAVES OF DOUGH.
No. 558,337. Patented Apr. 14, 1896.
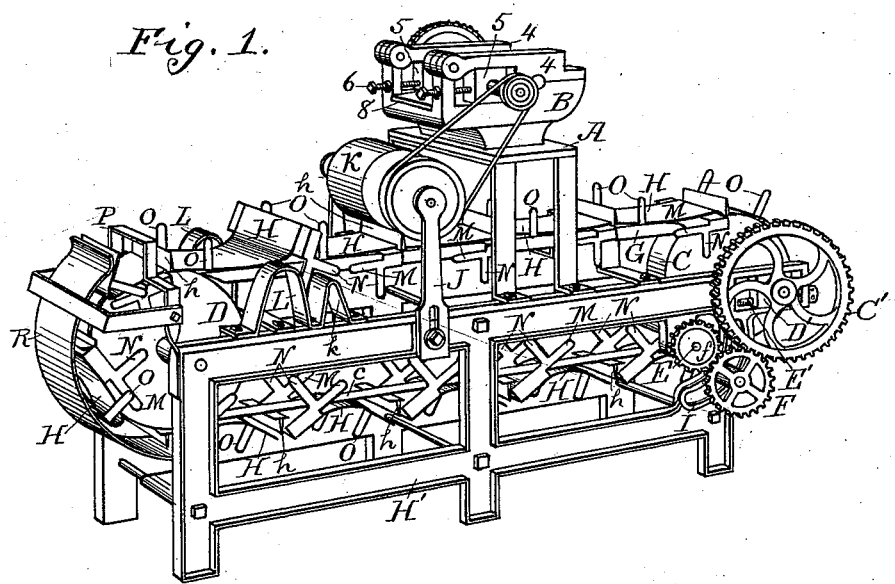
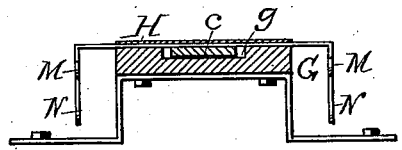
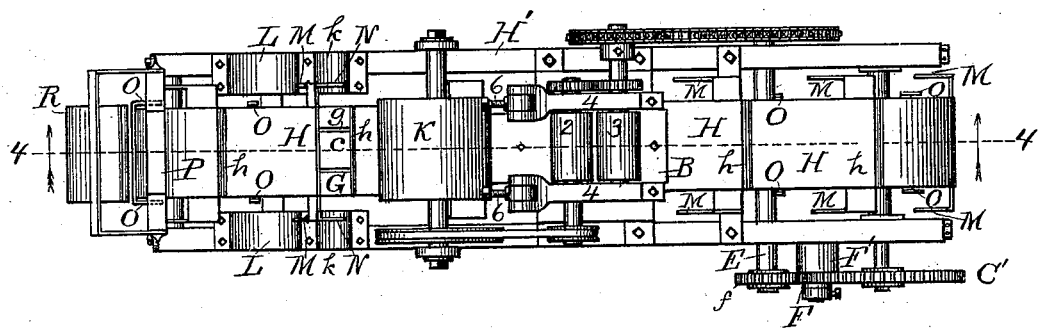
Witnesses:
R. J. Jacker,
Horace F. White
Inventors
H. M. Louis Anderson and
John Nelson
By Frank D. Thomason Atty.

(No Model.) 2 Sheets—Sheet 2.

H. M. L. ANDERSON & J. NELSON.
MACHINE FOR FORMING LOAVES OF DOUGH.

No. 558,337. Patented Apr. 14, 1896.

Witnesses:
R. J. Jacker
Horace F. White

Inventors
H. M. Louis Anderson and
John Nelson
By Frank D. Thomason
Atty.

UNITED STATES PATENT OFFICE.

HANS M. LOUIS ANDERSON AND JOHN NELSON, OF CHICAGO, ILLINOIS, ASSIGNORS TO SAID ANDERSON AND WILLIAM BALSTER, OF SAME PLACE.

MACHINE FOR FORMING LOAVES OF DOUGH.

SPECIFICATION forming part of Letters Patent No. 558,337, dated April 14, 1896.

Application filed November 25, 1893. Serial No. 491,991. (No model.)

*To all whom it may concern:*

Be it known that we, HANS M. LOUIS ANDERSON and JOHN NELSON, of Chicago, in the county of Cook and State of Illinois, have invented certain new and useful Improvements in Machines for Forming Loaves of Dough, of which the following is a full, clear, and exact description, reference being had to the accompanying drawings, and to the letters and figures of reference marked thereon.

Our invention relates more particularly to that class of bread-making machines used for the shaping of the dough into loaves, especially "turnover" loaves, quickly and neatly, substantially as hereinafter fully described, and as illustrated in the drawings, in which—

Figure 4:
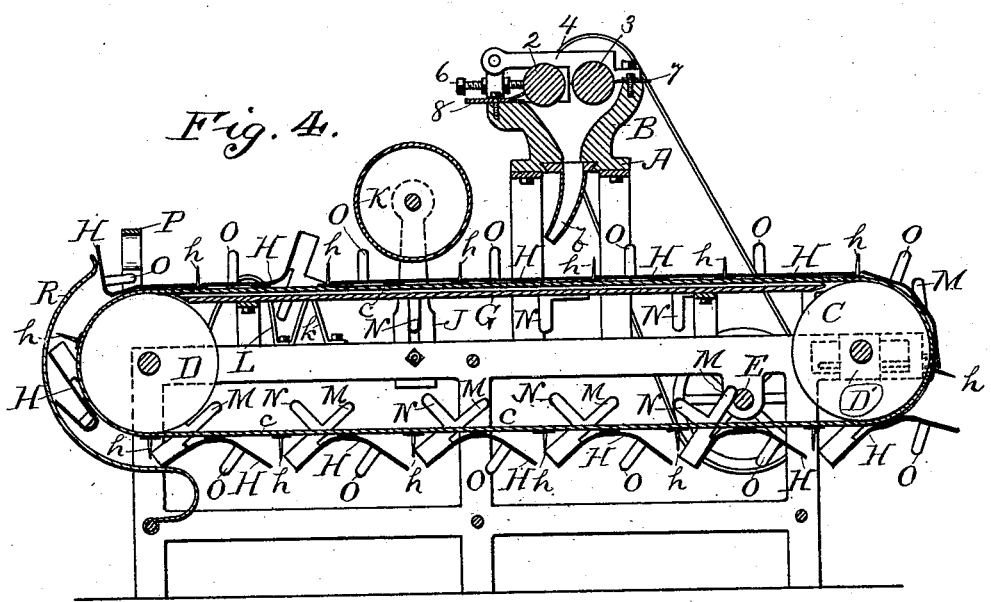

Figure 1 shows a perspective view of our invention. Fig. 2 is a plan view of the same. Fig. 3 is a side elevation thereof. Fig. 4 is a longitudinal vertical section taken on the dotted line 4 4, Fig. 2; and Fig. 5 is a detail view showing a cross-section of the platform over which the upper stretch of belt travels.

Referring to the drawings, H' represents a suitable supporting-frame for our improved machine. Resting on and secured to the upper longitudinal edges of this supporting-frame, preferably nearer the end of the machine where the power is applied, are uprights, which are connected to and support a platform A, forming the bottom or base of the dough-hopper B, which latter will hereinafter be more fully described. It is sufficient to state at this point that the dough issues from a chute *b*, leading downward from the bottom of said hopper, in a layer about one inch thick (more or less) and as wide as it is intended the loaf should be long.

Journaled in the ends of the supporting-frame are large pulleys or drums C and D, which are connected by a broad belt *c*, made of leather or other suitable material. The pulley C is journaled in bearing-blocks D', which are adjustable longitudinally in the guideways *e* by means of the gage-screws E'. This adjustment is deemed desirable, so as to keep the belt taut. One of the journals of the pulley C extends beyond its bearings and is provided with a large gear C', and this gear is driven by the pinion *f* on the adjacent end of the drive-shaft E through the medium of the idle-gear F. This idle-gear is journaled in a bearing-block F', which is adjustable in the segmental guideways I, made, as shown, in the supporting-frame of the machine. This adjustment of the idle-gear is rendered necessary when the gear C' is adjusted.

The upper stretch of the belt *c* is backed by and travels lengthwise over a longitudinal platform G, which extends clear from one pulley to the other. It is wider than said belt and is provided with a suitable longitudinal channel *g*, in which said belt moves. This belt is provided with a given number of flexible trays H, which follow each other in close succession. The width of these trays is slightly greater than the width of the layer of dough deposited thereon from the hopper and their length corresponds to the length of the portion of the layer of dough which is necessary to form a loaf, as will hereinafter be more fully explained. Between each of these trays H there is secured to the belt a transverse blade *h*. These blades correspond in construction and project at right angles from the plane of the belt a sufficient distance to cut through the layer of dough when passing under and coming in contact with the cylinder K, which latter is suitably journaled in the standards J J, secured to and arising from the upper edges of the longitudinal sides of the supporting-frame of the machine. The cylinder K is capable of a limited vertical adjustment, if desired, so that its lowest segment will just be touched by the cutting edges of the blades as the latter are carried under it, and thus cut the layer of dough, which has been previously deposited on the belt from the dough-hopper, into lengths sufficient to form loaves from.

The trays are made of very flexible material, such as thick sheets of rubber or thin sheet-steel, and are secured to the belt only at their centers of length midway between the blades *h*. Secured to the under surface of the rear part of these trays is a transverse plate, which reinforces the rear edges of the same. The ends of these transverse plates extend beyond the sides of the trays and the platform G and are each provided with a normally forwardly-extending horizontal arm M and an arm N, extending vertically downward therefrom as the trays to which they are attached pass over the platform G. These arms are preferably made integral and together form an L. We also secure to the under surface of the forward part of the trays H a transverse plate, which reinforces the forward edges of said trays and has its ends extend beyond the sides of the trays and bent vertical to the plane of the belt, so as to form the arms O and cause them to project upward therefrom as the tray to which they are attached passes over the platform G.

After the trays have passed under the cylinder K the arms N come in contact with the hurdles k, which are secured to the supporting-frame in such position as to come in the path of said arms N. The height of these hurdles k is such that when the arms N come in contact with them the rear part of the trays are bent upward and forward, so as to fold the rear portion of the layer of dough on the tray to which they are attached over onto the middle portion, whereupon the arms M come in contact with the second set of hurdles L, and the rear part of the trays are caused to assume a position which is about parallel to the central part of the same. When the rear edges of the layer of dough on each tray are thus folded, the rear part of the tray immediately reassumes its normal position, and at almost the same time the arms O O come in contact with an overhead arch or frame P, which is secured to the left-hand end of the machine and bridges over the belt c. The arms O, coming in contact with the arch P, cause the forward edge of the tray to which they are attached to bend upward to about right angles to the plane of the upper stretch of the belt and so as, before the said arms O are out of engagement with the arch, to come in contact with the upturned adjacent edges of the shield R. This shield causes the forward end edges of the tray to fold over the central part of the tray, so as to roll the forward portion of the layer of dough over the previously-folded-over rear portion thereof, and thus complete the formation of the loaf. The loaves can be formed, however, without the use of this shield. The loaves so formed by our machine are in succession carried around the circumference of the pulley and between the same and the shield and completely reversed. In this position the loaves are swept off the lower end of the shield by the blades and are caught in a suitable pan by the operator or otherwise and removed.

The dough-hopper B consists of a suitable receptacle, having its upper end partially closed by the two transverse rollers 2 and 3. Passing between these rollers the dough enters a suitable chute b, from which it issues onto the trays, as hereinbefore described. Roller 3 is journaled in suitable bearings formed in the rear ends of the longitudinal arms 4 4, which are hinged at their forward ends to posts arising from the forward portion of the hopper-frame. The roller 2 is journaled in bearing-blocks 5 5, which are adjustable in guideways made between the under edges of the arms 4 and the recessed upper edges of the sides of the hopper by means of the gage-screws 6 6. This adjustability of roller 2 is provided for the purpose of advancing it toward or from roller 3, and thus regulate the thickness it is desired the layer of dough should have.

Both the rollers 2 and 3 are respectively provided with scraping-knives 7 and 8, which, as shown, are secured to the upper front and rear edges of the hopper in such manner as to be slightly adjustable to and from the rollers. These scrapers remove the particles of dough which might otherwise adhere to the rollers and keep them clean.

It will be understood that any other suitable mechanism for making the layer of dough which is to be deposited on the trays can be substituted for the peculiar dough-hopper hereinbefore described, or the layers could be formed by hand. We prefer, however, substantially the construction of the dough-hopper shown.

What we claim as new is—

1. In a bread-making machine, the combination of an endless belt, flexible trays secured thereto, means to cause first one end portion of the trays and then the other to fold over the central portion thereof, and transverse blades secured to said belt between said trays, with a cylinder, with which said blades come in contact as they pass under the same.

2. In a bread-making machine, the combination with an endless belt, flexible trays secured thereto, means to cause first one end portion of the trays and then the other to fold over the central portion thereof, and transverse blades secured to said belt between said trays, of an overhead hopper for depositing a layer of dough on said tray, and a cylinder with which said blades come in contact, as they pass beneath the same.

3. In a bread-making machine, the combination with suitable drums or pulleys, an endless belt revolving around the same, and trays secured thereto, means to cause first one end portion of the trays and then the other to fold over the central portion thereof, and transverse blades secured to said belt between said trays, of a segmental shield surrounding one of said pulleys as set forth.

4. In a bread-making machine, the combination with an endless belt, flexible trays secured thereto, means to cause first one end portion of the trays and then the other to fold over the central portion thereof, and transverse blades secured to said belt between said trays, of the hopper depositing a layer of dough on said trays, a cylinder with which said blades come in contact as they pass beneath the same, and a segmental shield partly surrounding one of said pulleys, as set forth.

5. In a bread-making machine, the combination with an endless belt, flexible trays secured thereto, the arms M and N, secured to the sides of the rear portion of said trays in a vertical plane and at right angles to each other, and the arms O secured in a vertical plane to the sides of the forward portion thereof and extending in the opposite direction from said belt that arms M, N, do, of the hurdles k, and L, and the arch P all located with reference to and designed to intercept said arms M, N, and O, respectively, as set forth.

6. In a machine for forming loaves of dough, the combination with an endless belt, flexible trays secured thereto, and arms M, and N, secured to the sides of the rear portion thereof in a vertical plane and at right angles to each other, as described, and the arms O secured in a vertical plane to the sides of the forward portion of said tray and extending in the opposite direction from said belt that arms N, and M, do, of the hurdles k, and L, the arch P, and the segmental shield R, all located with reference to and designed to intercept said arms M, N, and O, respectively, as set forth.

7. In a machine for forming loaves of dough, the combination with an endless belt, flexible trays secured thereto, and arms N, and M, secured to the sides of the rear portion thereof, in a vertical plane and at right angles to each other, as described, and the arms O secured in a vertical plane to the sides of the front portion of said trays and extending in the opposite direction from said belt that arms M, and N, do, of the hurdles k and L, and the arch P all located with reference to and designed to intercept said arms N, M and O, respectively, the segmental shield R, and the hopper B, as set forth.

H. M. LOUIS ANDERSON.
JOHN NELSON.

Witnesses:
FRANK D. THOMASON,
STANLEY B. LAFFERTY.